(12) United States Patent
Tanaka et al.

(10) Patent No.: US 11,048,140 B2
(45) Date of Patent: Jun. 29, 2021

(54) OPTICAL MODULATOR

(71) Applicant: SUMITOMO ELECTRIC INDUSTRIES, LTD., Osaka (JP)

(72) Inventors: Hajime Tanaka, Osaka (JP); Tsutomu Ishikawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/694,594

(22) Filed: Nov. 25, 2019

(65) Prior Publication Data

US 2020/0192132 A1 Jun. 18, 2020

(30) Foreign Application Priority Data

Dec. 12, 2018 (JP) .............................. JP2018-232233

(51) Int. Cl.
| | |
|---|---|
| *G02F 1/225* | (2006.01) |
| *G02F 1/21* | (2006.01) |
| *G02F 1/025* | (2006.01) |
| *G02B 6/12* | (2006.01) |
| *G02B 6/122* | (2006.01) |

(52) U.S. Cl.
CPC ............ *G02F 1/2257* (2013.01); *G02F 1/025* (2013.01); *G02F 1/212* (2021.01); *G02B 6/1228* (2013.01); *G02B 2006/12142* (2013.01); *G02B 2006/12159* (2013.01); *G02F 2202/101* (2013.01); *G02F 2202/102* (2013.01); *G02F 2203/50* (2013.01)

(58) Field of Classification Search
None
See application file for complete search history.

(56) References Cited

U.S. PATENT DOCUMENTS

2011/0235961 A1* 9/2011 Hashimoto ........... G02F 1/2257
385/3

FOREIGN PATENT DOCUMENTS

JP 04204524 A * 7/1992 ........... G02F 1/3132

OTHER PUBLICATIONS

Kiymoto et al., Machine translation of JP 04-204524 A, Jul. 24, 1992. (Year: 1992).*
Yuda, M., et al., Degradation mode in semiconductor optical modulators, Electronics Letters, vol. 31, No. 20, pp. 1778-1779, Sep. 28, 1995.

* cited by examiner

*Primary Examiner* — Michelle R Connelly
(74) *Attorney, Agent, or Firm* — Smith, Gambrell & Russell, LLP.

(57) ABSTRACT

An optical modulator includes: a waveguide made of semiconductor, a light being input to one of ends of the waveguide; and a first electrode provided on the waveguide and overlapping with a part of the waveguide, wherein the waveguide has a first region to a third region along a propagation direction of the light from the one of ends, wherein neither the first region nor a part of the second region on a side of the first region in the propagation direction overlaps with the first electrode, wherein the third region and a part of the second region on a side of the third region in the propagation direction overlap with the first electrode, wherein a second width of the second region is larger than a first width of the first region and a third width of the third region.

8 Claims, 7 Drawing Sheets

OPTICAL MODULATOR

CROSS-REFERENCE TO RELATED APPLICATION

This application is based upon and claims the benefit of priority of the prior Japanese Patent Application No. 2018-232233, filed on Dec. 12, 2018, the entire contents of which are incorporated herein by reference.

BACKGROUND

(i) Technical Field

The present invention relates to an optical modulator.

(ii) Related Art

There is developed an optical modulator which includes a semiconductor layer and modulates a light (for example, see M. Yuda, M. Fukuda and H. Miyazawa, Degradation mode in semiconductor optical modulators, ELECTRONICS LETTERS, 1995, Sep. 28, Vol. 31, No. 20, pp. 1778-1779).

SUMMARY

When a light is input to the optical modulator and a voltage is applied to an electrode of the optical modulator, the optical modulator operates. The semiconductor layer of the optical modulator absorbs the light and generates a current. A short breakage happens to occur due to the current caused by the optical absorption. And so, an aim of the present invention is to provide an optical modulator that is capable of suppressing the short breakage.

According to an aspect of the present invention, there is provided an optical modulator including: a waveguide that is made of semiconductor, a light being input to one of ends of the waveguide; and a first electrode that is provided on the waveguide and overlaps with a part of the waveguide, wherein the waveguide has a first region, a second region and a third region along a propagation direction of the light in this order from the one of ends, wherein neither the first region nor a part of the second region on a side of the first region in the propagation direction overlaps with the first electrode, wherein the third region and a part of the second region on a side of the third region in the propagation direction overlap with the first electrode, wherein the first region has a first width, wherein the second region has a second width, wherein the third region has a third width, wherein the second width is larger than the first width and the third width.

DETAILED DESCRIPTION

Figure 1:
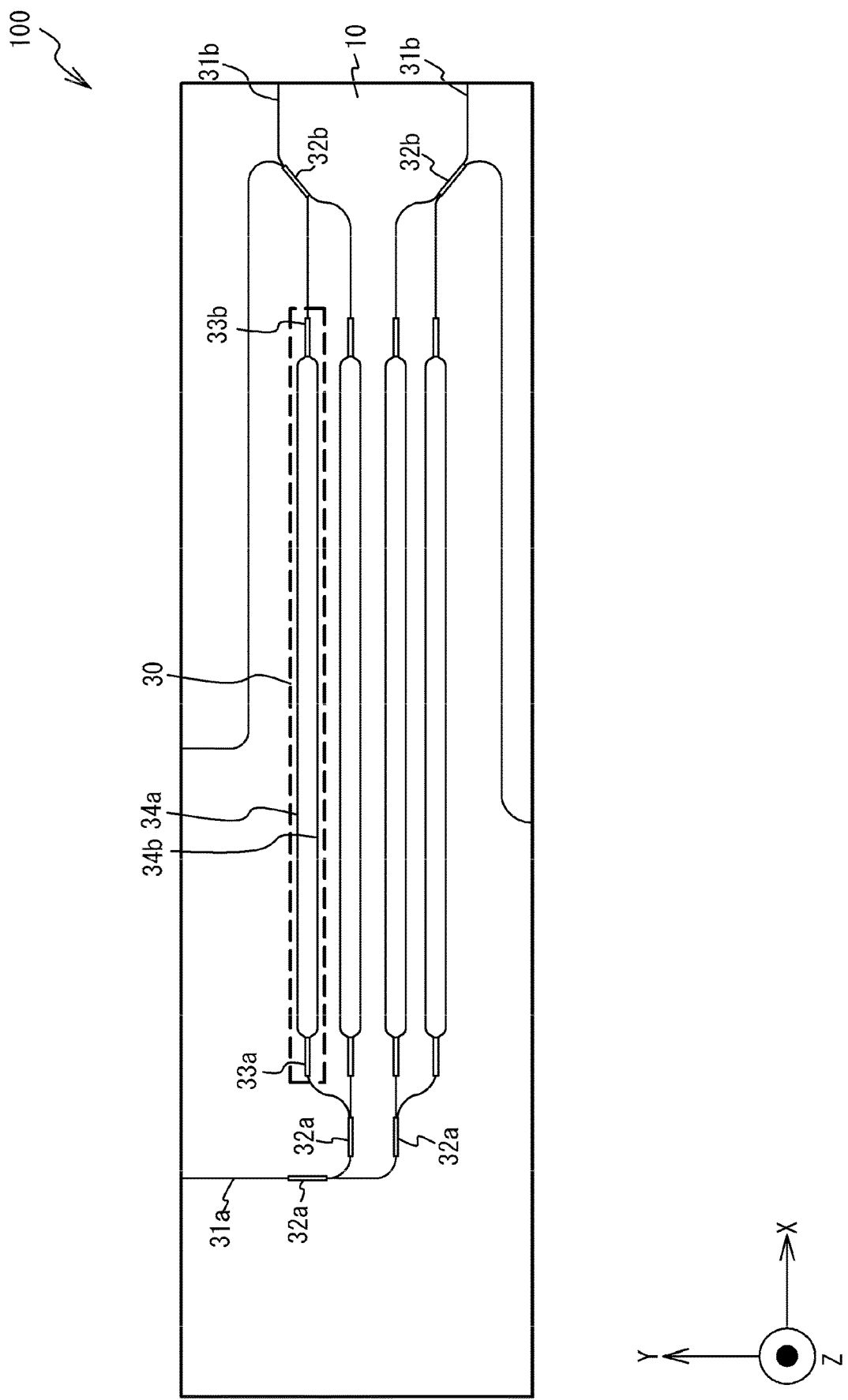
FIG. 1 illustrates a plan view of waveguides of an optical modulator in accordance with a first embodiment.

[Description of Embodiments of the Present Invention]

First, the subject matter of an embodiment of the present invention is described as listed below.

An embodiment of the present invention is (1) an optical modulator including: a waveguide that is made of semiconductor, a light being input to one of ends of the waveguide; and a first electrode that is provided on the waveguide and overlaps with a part of the waveguide, wherein the waveguide has a first region, a second region and a third region along a propagation direction of the light in this order from the one of ends, wherein neither the first region nor a part of the second region on a side of the first region in the propagation direction overlaps with the first electrode, wherein the third region and a part of the second region on a side of the third region in the propagation direction overlap with the first electrode, wherein the first region has a first width, wherein the second region has a second width, wherein the third region has a third width, wherein the second width is larger than the first width and the third width. When the second width is large, a density of the light is reduced. And a density of a current caused by the optical absorption is reduced. Therefore, heat caused by the current is reduced. And increasing of the current is suppressed. Accordingly, the short breakage is suppressed. And, when the third width is small, it is possible to suppress occurrence of unnecessary guided mode.

(2) The waveguide may have a fourth region between the first region and the second region along the propagation direction. The waveguide may have a fifth region between the second region and the third region along the propagation direction. A width of the fourth region may increase from a side of the first region toward a side of the second region. A width of the fifth region may decrease from the side of the second region toward a side of the third region. A tangent of an inclination angle from the fourth region and the fifth region to the propagation direction may be 0.002 or more and 0.05 or less. When the width of the waveguide gradually changes in the fourth region and the fifth region, it is possible to suppress occurrence of the unnecessary mode and reduction of modulation efficiency.

(3) The second width may be twice or more than twice as large as the first width. In this case, the current density is reduced. It is therefore possible to effectively suppress the short breakage.

(4) The second width may be 2 μm or more and 5 μm or less. In this case, the current density is reduced. It is therefore possible to effectively suppress the short breakage. And it is possible to suppress occurrence of the unnecessary guided mode.

(5) The third width may be equal to the first width. When the first region and the third region have a small width, it is possible to suppress occurrence of the unnecessary guided mode.

(6) The optical modulator may further includes a substrate; a first semiconductor layer that is provided on the substrate and has a first conductive type; a core layer that is provided on the first semiconductor layer; a second semiconductor layer that is provided on the core layer and has a second conductive type; and a second electrode that is electrically connected with the first semiconductor layer. The first electrode may be electrically connected with the second semiconductor layer. The waveguide may include the first semiconductor layer, the core layer and the second semiconductor layer. When a direct current voltage is applied between the first electrode and the second electrode, electrical field is generated in a stacking direction of layers. When the core layer absorbs a light guided in the waveguide, the current flows in the core layer, the first semiconductor layer and the second semiconductor layer. When the width of the waveguide is enlarged, the current density is reduced. It is therefore possible to suppress the short breakage.

(7) The first semiconductor layer and the second semiconductor layer may include indium phosphorus and indium gallium arsenic. The core layer may include gallium indium arsenic phosphorus. The enlarged width of the waveguide suppresses the breaking of the layers.

[Details of Embodiments of the Present Invention]

The following is a description of a specific example of an optical modulator according to an embodiment of the present invention, with reference to the drawings. It should be noted that the present invention is not limited to these examples but is shown by the claims, and it is intended that all modifications are included in the equivalents of the claims and the scope of the claims.

First Embodiment (Optical Modulator) FIG. 1 illustrates a plan view of waveguides of an optical modulator 100 in accordance with a first embodiment. An X-axis indicates a direction along which arm waveguides 34a and 34b extend. A Y-axis indicates a width direction of arm waveguides 34a and 34b (waveguide). A Z-axis indicates a stacking direction of semiconductor layers in the waveguide. These directions are vertical to each other.

As illustrated in FIG. 1, the optical modulator 100 has a structure in which an input waveguide 31a, output waveguides 31b, optical couplers 32a, optical couplers 32b, and Mach-Zehnder optical modulators 30 are provided on a substrate 10. The input waveguide 31a, the output waveguide 31b and the optical couplers 32a and 32b are formed by mesa-shaped waveguides. The optical couplers 32a and 32b are MMI (Multimode Interferometer) type optical couplers. The Mach-Zehnder optical modulators 30 have a structure in which a plurality of mesa-shaped waveguides are combined. A light input from the input waveguide 31a is branched by the optical couplers 32a. The branched lights pass through the Mach-Zehnder optical modulators 30, and are multiplexed by the optical couplers 32b. The multiplexed light is output from the output waveguides 31b. A size of the optical modulator 100 is, for example, 10 mm×4 mm.

The Mach-Zehnder optical modulators 30 have a structure in which two optical couplers 33a and 33b, and two arm waveguides 34a and 34b connected between the optical couplers 33a and 33b. The optical couplers 33a and 33b and the arm waveguides 34a and 34b are formed by mesa-shaped waveguides.

The optical coupler 33a branches the light input from the input waveguide 31a. The two arm waveguides 34a and 34b extend in the X-axis direction. The branched lights branched by the optical coupler 33a propagate in the arm waveguides 34a and 34b from −X side to +X side. The optical coupler 33b multiplexes the lights having propagated in the two arm waveguides 34a and 34b. The optical couplers 33a and 33b are MMI type optical couplers. For example, the light propagating in the arm waveguides 34a and 34b is a fundamental mode.

Figure 2:
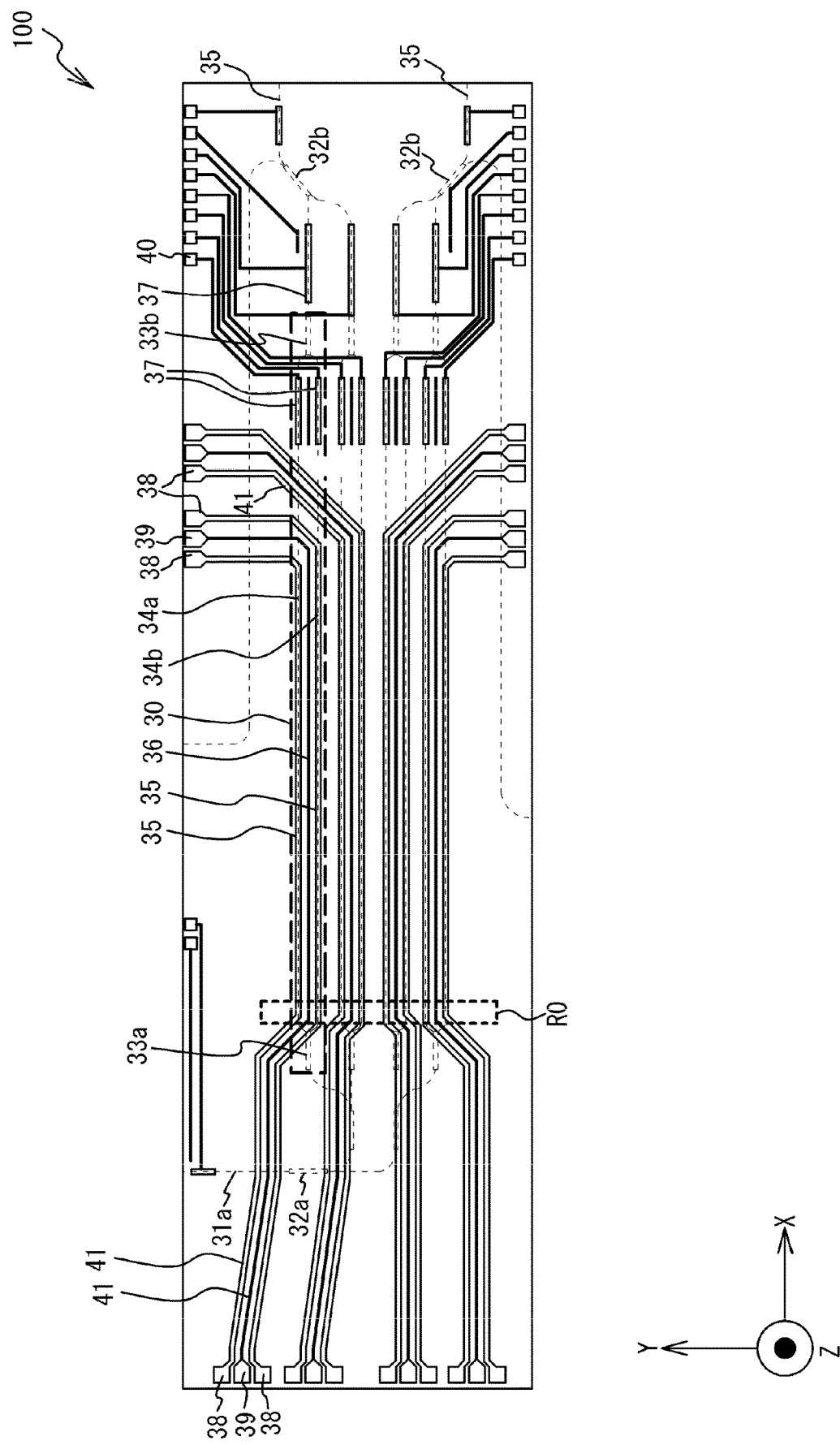
FIG. 2 illustrates a plan view of an optical modulator in accordance with a first embodiment.

FIG. 2 illustrates a plan view of the optical modulator 100. In FIG. 2, a wiring pattern is illustrated with solid lines, and waveguides explained on the basis of FIG. 1 are illustrated with thin dotted lines. In the optical modulator 100 of the first embodiment, the mesa-shaped waveguide is buried by resin.

The wiring pattern includes a modulation electrode 35, a ground electrode 36, and electrode 37 for phase adjustment. The modulation electrode 35 is provided on the arm waveguides 34a and 34b of the Mach-Zehnder optical modulator 30, and is connected to a bonding pad 38 for signal, via a connection wiring 41. The ground electrode 36 is provided between the arm waveguide 34a and the arm waveguide 34b, and is connected to a bonding pad 39 for ground, via the connection wiring 41. The electrode 37 for phase adjustment is provided on the arm waveguides 34a and 34b of the Mach-Zehnder optical modulator 30 and is connected to a DC electrode pad 40. The position of the electrode 37 for phase adjustment is different from that of the modulation electrode 35.

When a high frequency electrical signal is supplied to the modulation electrode 35 from the bonding pad 38, a high frequency (for example, 20 GHz or the like) electrical signal flows between the ground electrode 36 and the modulation electrode 35. Thus, diffraction indices of the arm waveguides 34a and 34b change. And, phases of the lights propagating in the arm waveguides 34a and 34b change. The lights propagating in the arm waveguides 34a and 34b are subjected to phase modulation. And, the modulated optical signals output from the output waveguide 31b. A direct current voltage is superimposed on the high frequency electrical signal, prior to being supplied to the modulation electrode 35.

When another direct current voltage is applied to the electrode 37 for phase adjustment from the DC electrode pad 40, the diffraction indices of the arm waveguides 34a and 34b are shifted by a given value. The another direct current voltage is set to a value (optimal value) so that the light propagating in the arm waveguides 34a and 34b is a favorably modulated by the electrical signal supplied to the modulation electrode 35. That is, the electrode 37 for phase adjustment adjusts the phases of the lights propagating in the arm waveguides 34a and 34b so that the lights propagating in the arm waveguides 34a and 34b are favorably modulated. The two arm waveguides 34a and 34b may be referred to as an arm waveguide 34.

The optimal value of the direct current voltage supplied to the electrode 37 for phase adjustment depends on an optical path length difference between the arm waveguides 34a and 34b. The optical path length difference between the arm waveguides 34a and 34b varies in accordance with a wavelength of the lights propagating in the arm waveguides 34a and 34b. A first wavelength light is input into the optical modulator 100 at a first term, in a wavelength range of 1530 nm to 1570 nm. A second wavelength light is input into the optical modulator 100 at a second term, in the wavelength range of 1530 nm to 1570 nm. A second term is different from the first term. The second wavelength is different from the first wavelength. And so, a relationship table between the wavelength of the input light and the supplied direct current voltage is made in advance. The value of the direct current voltage is determined on the basis of the relationship table, during the operation of the optical modulator 100. The optical path length difference between the arm waveguides 34a and 34b varies in accordance with the temperature difference between the arm waveguides 34a and 34b. Therefore, a TEC (Thermo-electric Cooler) keeps the temperature of the optical modulator 100 mounted on the TEC to a constant temperature (for example, 70 degrees C.).

A length of the modulation electrode 35 in the X-axis direction is, for example, 3 mm. A part having a length in the range from a several tens μm to a few hundreds μm where overlapping between the arm waveguides 34a and 34b and the modulation electrode 35 starts is referred to as a region R0.

Figure 3:
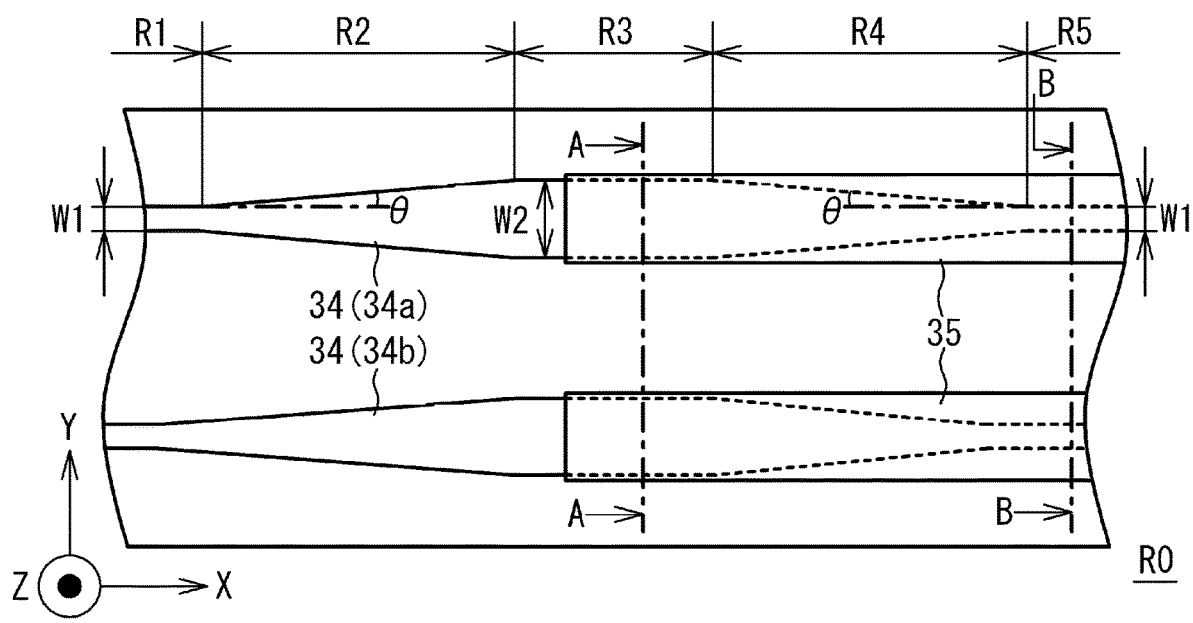
FIG. 3 illustrates a plan view in which a part around a modulation electrode is enlarged.

FIG. 3 illustrates a plan view of the optical modulator 100. In FIG. 3, a part around the modulation electrode 35 in the region R0 of FIG. 2 is enlarged. As illustrated in FIG. 3, the arm waveguide 34 has regions R1, R2, R3, R4 and R5. The regions R1 to R5 are arranged from −X side to +X side. The regions R1 and R2 are not overlapped with the modulation electrode 35. A part of the region R3 on the side of the region R1 is not overlapped with the modulation electrode 35. A part of the region R3 on the side of the region R5 overlaps with the modulation electrode 35. The regions R4 and the region R5 overlap with the modulation electrode 35. In FIG. 3, the light propagates in the waveguide from the region R1 toward the region R5.

The region R1 (first region) has a width W1 (first width). The width W1 is for example, 1.5 μm. The width of the region R2 (fourth region) gradually increases from −X side to +X side. The region R3 (second region) has a width W2 (second width). The width W2 is, for example, 3 μm. The width of the region R4 (fifth region) gradually decreases from −X side to +X side. The region R5 (third region) has a width w1. That is, the width of the arm waveguide 34 is large in a region not overlapping with the modulation electrode 35, and is small in a region overlapping with the modulation electrode 35. An edge of the modulation electrode 35 is disposed in the region R3.

In the regions R3 and R5, side edges of the arm waveguide 34 have a straight line shape along the X-axis direction. A length of the region R3 is, for example, 60 μm. In the regions R2 and R4, side edges of the arm waveguide 34 have a straight line shape or a curved line shape. The regions R2 and R4 do not have a portion such as stairs in which a width rapidly varies. Therefore, the width of the arm waveguide 34 continuously varies. In the regions R2 and R4, inclination angles of the side edge of the arm waveguide 34 from the X-axis are denoted by θ. That is, the angle from a rear end of the region R1 (+X side edge) to a front end of the region R3 (−X side edge) is θ. And, the angle from a rear end of the region R3 to a front end of the region R5 is θ. For example, θ is 3 degrees or less. A tangent of the angle θ (tanθ) is 0.002 or more and 0.05 or less.

Figure 4A:
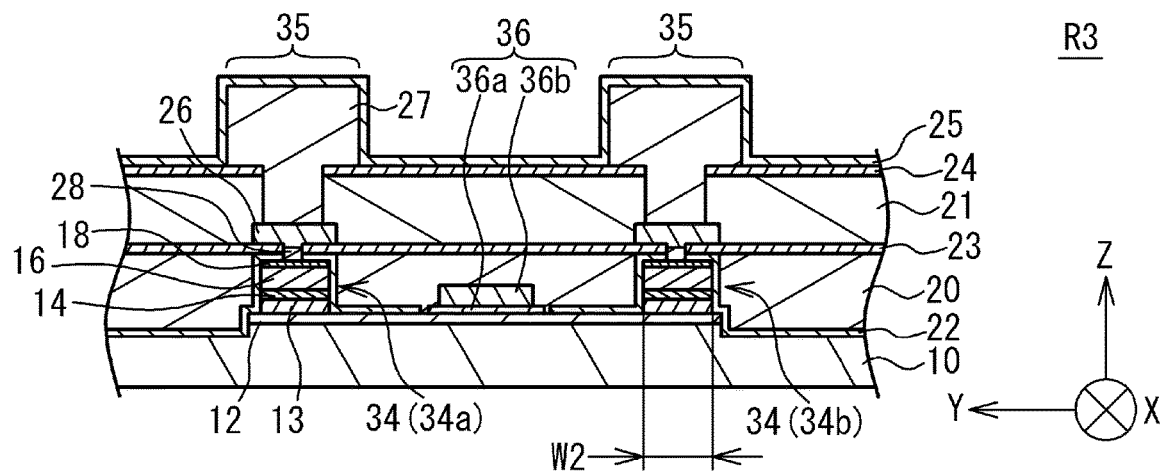
FIG. 4A and FIG. 4B illustrate cross sectional views around an arm waveguide.
Figure 4B:
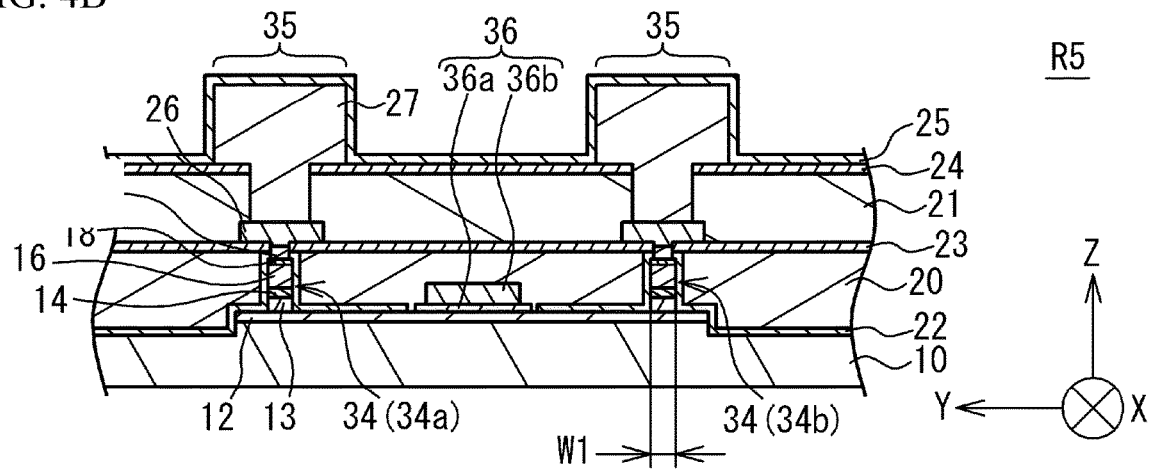

FIG. 4A and FIG. 4B illustrate cross sectional views around the arm waveguide 34. FIG. 4A illustrates a cross sectional view taken along a line A-A in the region R3 of FIG. 3. FIG. 4B illustrates a cross sectional view taken along a line B-B in the region R5 of FIG. 4B. As illustrated in FIG. 4A and FIG. 4B, a lower cladding layer 12, a lower cladding layer 13, a core layer 14, an upper cladding layer 16 and a contact layer 18 are stacked on the substrate 10 in this order.

The substrate 10 is a semiconductor substrate made of semi-insulating indium phosphorus (InP). For example, the lower cladding layers 12 and 13 are made of n-type InP in which silicon (Si) is doped. A thickness of the lower cladding layer 12 is, for example, 500 nm. A thickness of the lower cladding layer 13 is, for example, 800 nm. The core layer 14 is gallium indium arsenic phosphorus (GaInAsP) having a thickness of 500 nm and has a Multiple Quantum Well (MQW) structure. The upper cladding layer 16 is made of p-type InP in which zinc (Zn) is doped. For example, the p-type InP has a thickness of 1300 nm. The contact layer 18 is made of p-type InGaAs in which Zn is doped. For example, the p-type InGaAs has a thickness of 200 nm.

The compound semiconductor layer (the lower cladding layer 12, the lower cladding layer 13, the core layer 14, the upper cladding layer 16 and the contact layer 18) on the substrate 10 forms the arm waveguides 34a and 34b. The lower cladding layer 12 extending from the arm waveguide 34a to the arm waveguide 34b electrically couples the arm waveguide 34a and the arm waveguide 34b. The lower cladding layer 13, the core layer 14, the upper cladding layer 16 and the contact layer 18 form a mesa. The width of the arm waveguide 34 described in FIG. 3 is a width of the mesa in the Y-axis direction. The thicknesses of the layers of FIG. 4A and FIG. 4B are equal to each other among the regions R3 to R5. The contact layer 18 may be eliminated in the regions R1 and R2 where the modulation electrode 35 is not formed.

Resin layers 20 and 21, and insulating films 22, 23, 24 and 25 are formed on the substrate 10. The insulating film 22 covers the upper face of the substrate 10, the side face and the upper face of the lower cladding layer 12, and the side faces of the arm waveguides 34a and 34b. The insulating film 22 is directly in contact with side faces of the lower cladding layer 13, the core layer 14, and the upper cladding layer 16. The resin layer 20 is provided on the upper face of the insulating film 22 and buries the side faces of the arm waveguides 34a and 34b. The insulating film 23 is provided on the upper face of the resin layer 20. The resin layer 21 is provided on the upper face of the insulating film 23. The insulating film 24 is provided on the upper face of the resin layer 21. The insulating film 25 is provided on the upper face of the insulating film 24.

An ohmic layer 28, a plated layer 26 and an wiring layer 27 are stacked on the arm waveguide 34 in this order. The ohmic layer 28, the plated layer 26 and the wiring layer 27 act as the modulation electrode 35. The ohmic layer 28 contacts with the upper face of the contact layer 18. The plated layer 26 contacts with the upper face of the ohmic layer 28. The wiring layer 27 contacts with the upper face of the plated layer 26.

The ohmic layer 28 has a structure in which a Pt layer having a thickness of 30 nm, a Ti layer having a thickness of 50 nm, a Pt layer having a thickness of 50 nm, and an Au layer having a thickness of 200 nm are stacked in this order. A width of the ohmic layer 28 is, for example, 1 μm. For example, each of the plated layer 26 and the wiring layer 27 is a metal layer (TiW/Pt/Au) in which a titanium tungsten (TiW) layer having a thickness of 50 nm, a platinum (Pt) layer having a thickness of 50 nm, and a gold (Au) layer having a thickness of 50 nm are stacked in this order. A thickness of the plated layer 26 is, for example, 1 μm. A thickness of the wiring layer 27 is, for example, 4 μm.

The ground electrode 36 is provided on the lower cladding layer 12 between the arm waveguides 34a and 34b. The ground electrode 36 includes an n-electrode 36a and an electrode 36b stacked in this order. The ground electrode 36 is electrically coupled with the bonding pad 38 illustrated in FIG. 2. For example, the n-electrode 36a is made of an alloy of Au, germanium (Ge) and nickel (Ni) and has a thickness of 200 nm. The electrode 36b has a structure in which a Ti layer having a thickness of 50 nm, a Pt layer having a thickness of 50 nm, and an Au layer having a thickness of 900 nm are stacked in this order. The width of the n-electrode 36a is, for example, 17 μm. The width of the electrode 36b is, for example, 15 μm.

The insulating film 25 covers the insulating film 24 and the wiring layer 27. The bonding pads 38 and 39 illustrated in FIG. 2 is provided above the mesa of the compound semiconductor layer. The bonding pads 38 and 39 are provided on the upper face of the insulating film 22.

The resin layers 20 and 21 are made of BCB (benzocyclobutene) or the like. A thickness of the resin layer 20 is, for example, 2.5 μm. A thickness of the resin layer 21 is, for example, 3.5 μm. The insulating film 24 is, for example, a silicon oxide ($SiO_2$) film having a thickness of 0.3 μm. The insulating films 22, 23 and 25 are oxynitride silicon (SiON) films having a thickness of 0.3 μm.

A light is input to the arm waveguide 34. A high frequency electrical signal having amplitude of 0.3 volts and a frequency of 20 GHz is applied between the modulation electrode 35 and the ground electrode 36. A direct current voltage having a minus several volts, i.e. a reverse bias voltage of several volts, is applied between the modulation electrode 35 and the ground electrode 36 together with the high frequency electrical signal. Thus, the modulation of the light is performed by the electrical signal and the direct current voltage.

The ground electrode 36 contacts with the lower cladding layer 12 which is an n-type semiconductor layer. The lower cladding layers 12 and 13 are provided under the core layer 14. The modulation electrode 35 contacts with the contact layer 18 which is a p-type semiconductor layer. The contact layer 18 and the upper cladding layer 16 are provided on the core layer 14. Therefore, when the reverse voltage is applied between the electrode 35 and 36, an electrical field is generated and applied to the core layer 14 along the Z-axis direction.

When the core layer 14 absorbs a light, the core layer 14 generates a pair of electron and hole. These carriers flow toward +Z side or −Z side in accordance with the electrical field. Therefore, a current flows in the arm waveguide 34 along the Z-axis direction. When a density of the current (a current density) is large, short breakage may occur in the arm waveguide 34.

In the first embodiment, as illustrated in FIG. 3 to FIG. 4B, the region R3 of the arm waveguide 34 has a width W2 which is larger than those of other regions of the arm waveguide 34 such as the region R1. Therefore, the power density of the light in the arm waveguide 34 is smaller in the region R3 than in the region R1. Since the current density generated in the arm waveguide 34 depends on the power density of the light, the current density in the region R3 is reduced. In addition, the current density is also reduced as the current density is inversely proportional to the width of the arm waveguide 34. In this case, the short breakage is suppressed. As illustrated in FIG. 4B, the width of the arm waveguide 34 in the region R5 is narrower than that in the region R3. Although the width of the arm waveguide 34 is small, the power density of the light is small enough to avoid the short breakage in the region R5. This is because the light becomes weak due to the absorption in the core layer 14 in the regions R3 and R4. The smaller width of the arm waveguide 34 in region R5 is preferable to avoid generating unnecessary modes.

Figure 5:
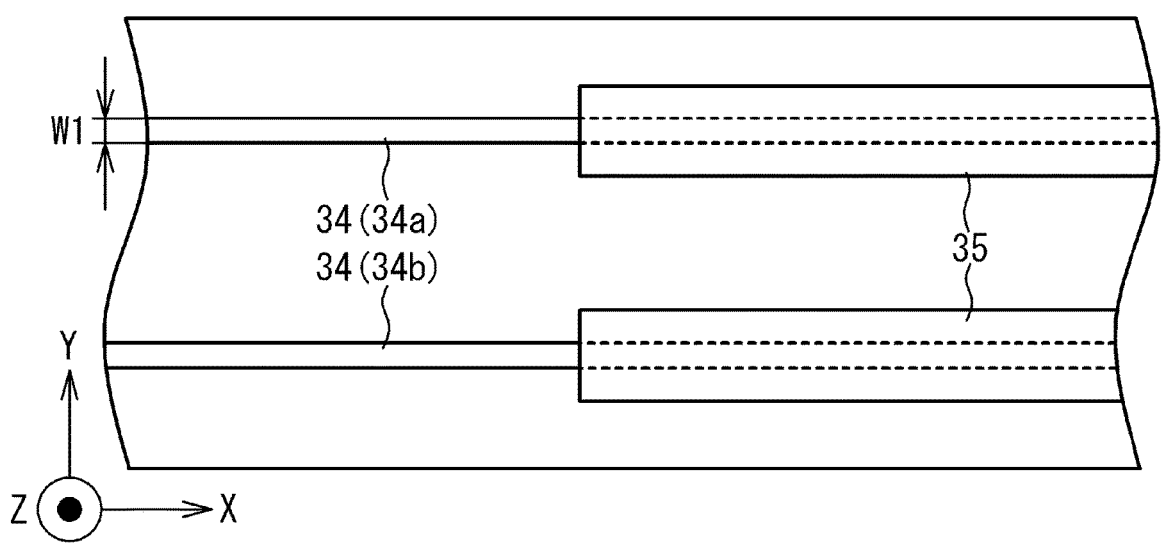
FIG. 5 illustrates a plan view of a comparative embodiment in which a modulation electrode and the vicinity are enlarged.

(Measured results) With respect to the first embodiment and a comparative embodiment, the I-V characteristic (current-voltage) of the optical modulator was measured. The optical modulator of the comparative embodiment is the same as that of the first embodiment, except for the width of the arm waveguide 34. FIG. 5 illustrates a plan view of the comparative embodiment in which the modulation electrode 35 and the vicinity are enlarged. As illustrated in FIG. 5, in the comparative embodiment, the width of the arm waveguide 34 is W1 that is a constant value. In the first embodiment and the comparative example, the material and the size are described above.

Figure 6A:
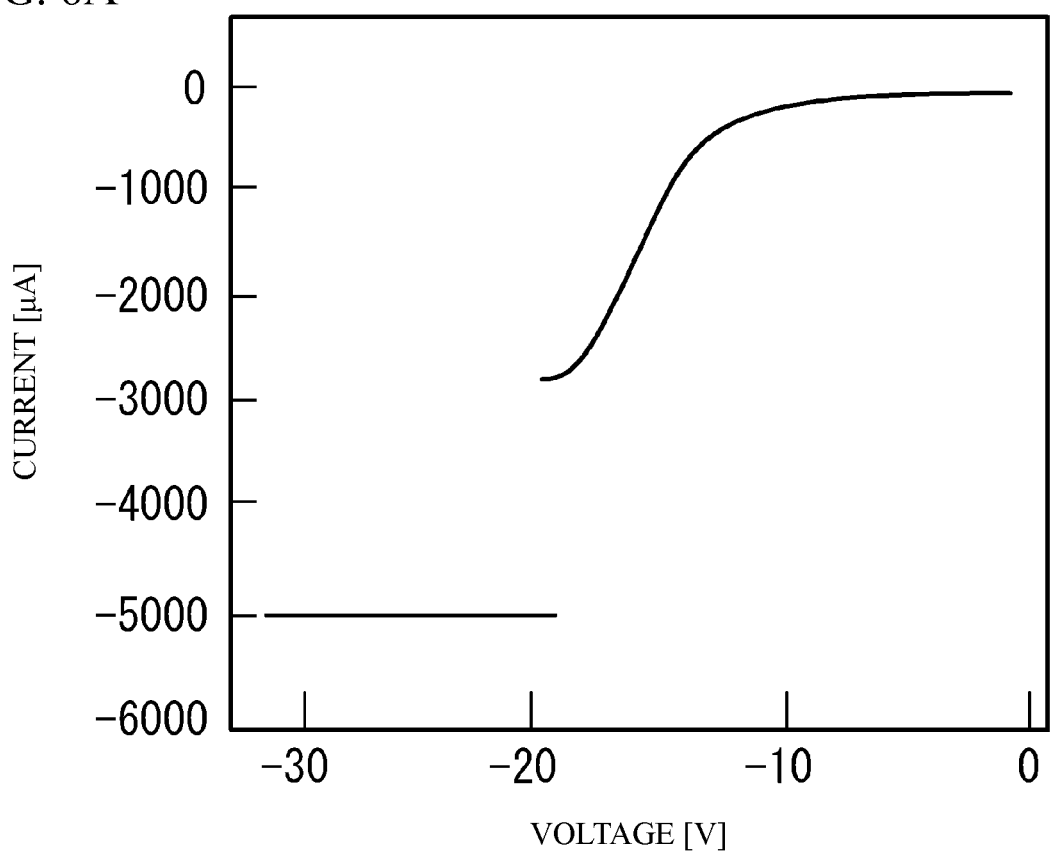
FIG. 6A and FIG. 6B illustrate I-V characteristic of a comparative embodiment.
Figure 6B:
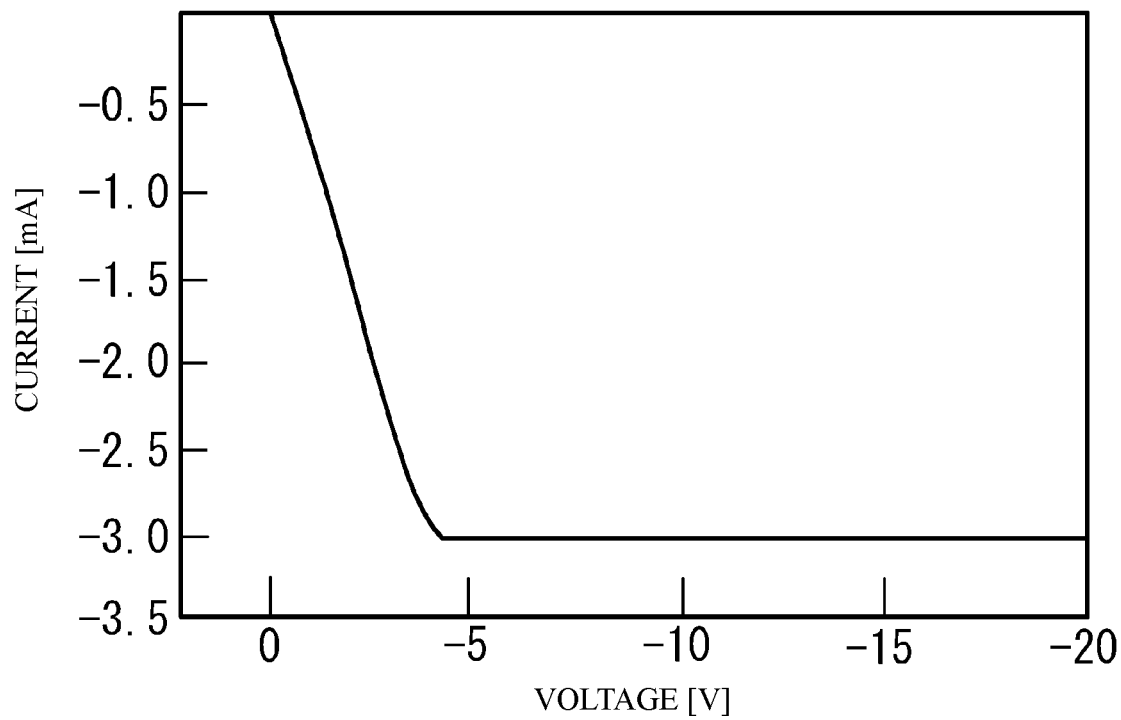
Figure 7A:
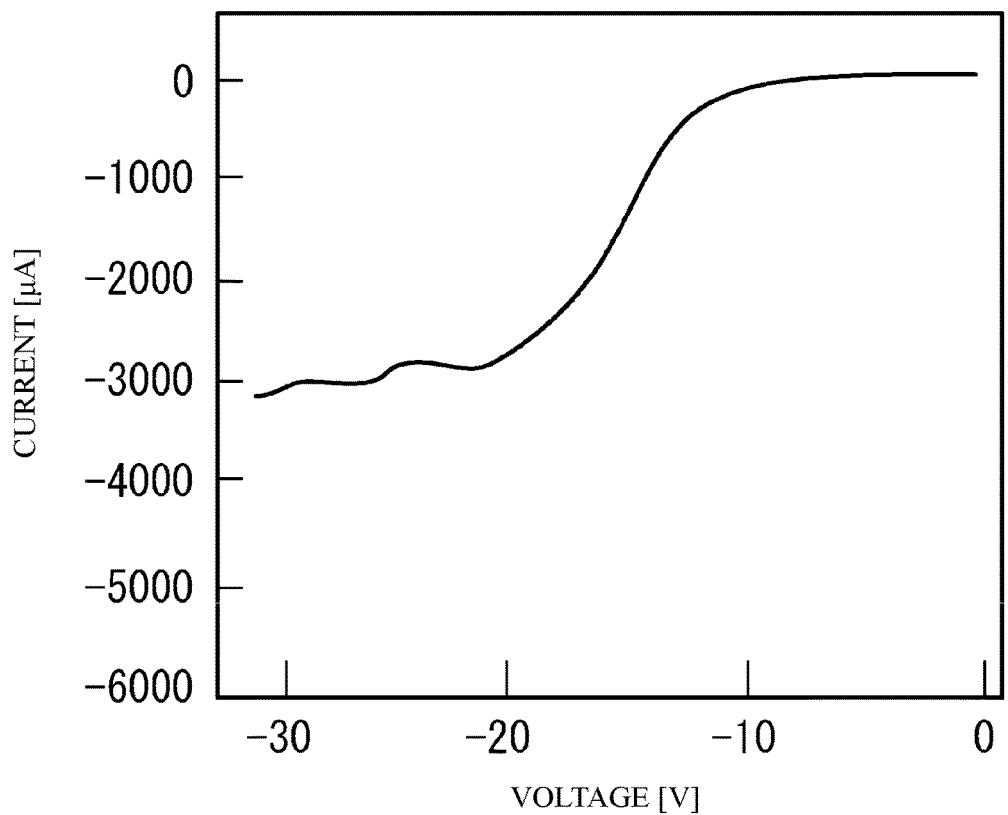
FIG. 7A and FIG. 7B illustrate I-V characteristic of a first embodiment.
Figure 7B:
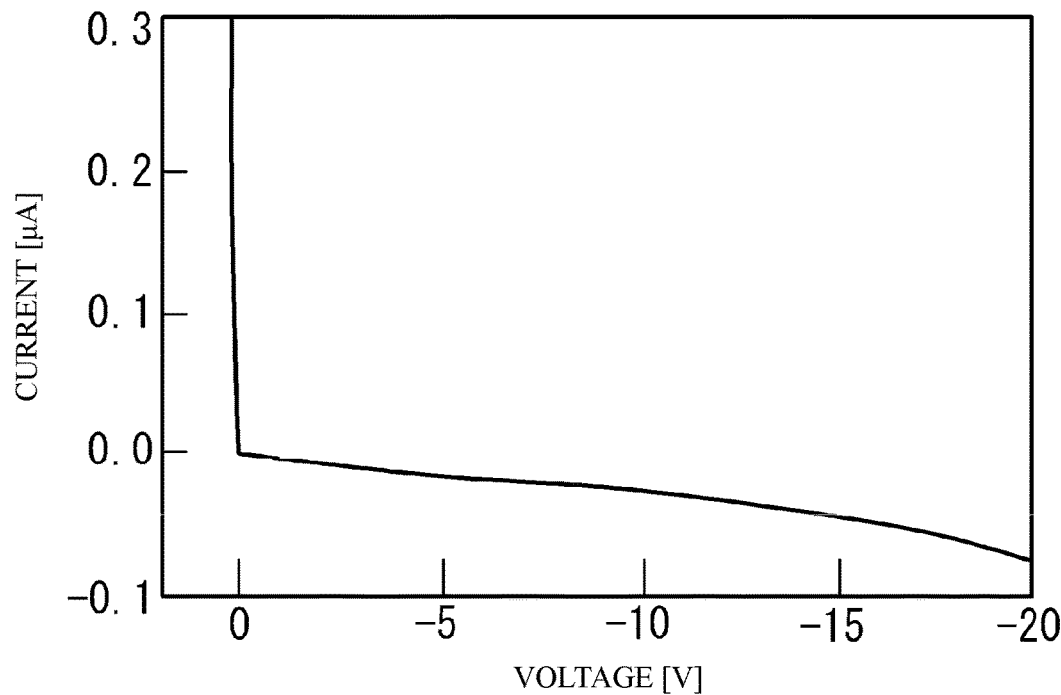

FIG. 6A and FIG. 6B illustrate I-V characteristic of the comparative embodiment. FIG. 7A and FIG. 7B illustrate I-V characteristic of the first embodiment. The horizontal axis indicates the voltage applied between the modulation electrode 35 and the ground electrode 36. The vertical axis indicates the current flowing between the electrodes.

In the measurement of FIG. 6A and FIG. 7A, a light having a wavelength of 1.57 μm and having constant optical intensity is input into the arm waveguide 34, a reverse bias voltage is applied between the electrodes, and the I-V characteristic was measured. A modulated signal of IQ modulation (IQ Modulation) is input into the optical modulator after the measurement of FIG. 6A and FIG. 7A without inputting a light into the optical modulator, and the I-V characteristic was measured. FIG. 6B and FIG. 7B illustrates the I-V characteristic in a case where the light is not input.

As illustrated in FIG. 6A, in the comparative embodiment, a discontinuity point existed in a current around −20 V, and the current rapidly changed from approximately −3000 μA to approximately −5000 μA. From this result, it is thought that short breakage may have occurred at a reverse bias voltage of −20 V. As illustrated in FIG. 6B, when the reverse voltage is applied to the optical modulator after the measurement of FIG. 6A, a current flows. That is, the I-V characteristic does not show rectification characteristic. From the result, it is thought that the optical modulator of the comparative embodiment causes the short breakage because of the current generated by inputting of the light in the measurement of FIG. 6A.

It is thought that the following phenomena occurs in the comparative embodiment. When the core layer 14 absorbs a light, a current flows in the arm waveguide 34 and heat is generated. When the heat is generated, a light absorption coefficient of the core layer 14 increases and the current increases. Thus, further heat and further current are generated. By the positive feedback, the current rapidly increases and short breakage of the core layer 14 occurs.

As illustrated in FIG. 7A, in the first embodiment, the current continuously changes along a curve together with the changing of the reverse bias voltage from 0 V to −30 V. Therefore, it is thought that the short breakage does not occur. As illustrated in FIG. 7B, in the first embodiment, when a forward voltage is applied, a current flows. When a reverse voltage is applied, a current does not flow. That is, the I-V characteristic has the rectification characteristic. Therefore, the optical modulator 100 of the first embodiment does not cause the short breakage in the measurement of FIG. 6A.

In the first embodiment, as illustrated in FIG. 3, the arm waveguide 34 has the regions R1 to R5. The region R1 and a part of the region R3 on the side of the region R1 are not overlapped with the modulation electrode 35. The region R1 has the width W1. The region R3 has the width W2 larger than w1. Thus, the optical density and the current density caused by the optical absorption are reduced. When the current density is reduced, the heat generation is suppressed. And, increasing of the optical absorption coefficient of the core layer 14 is suppressed. Therefore, the current does not increase, and the short breakage is suppressed.

When the width W2 is adopted from the regions R1 to R3 of the arm waveguide 34, it is possible to suppress the short breakage. However, unnecessary optical guided modes, e.g. higher-order modes, tends to be generated. The guided higher-order modes interfere with each other. In this case, the output intensity of the lights fluctuates. And the modulation efficiency may be reduced. In the first embodiment, in the arm waveguide 34, the region R5 overlapping with the modulation electrode 35 has the width W1 smaller than the width W2. It is therefore possible to suppress occurrence of unnecessary guided mode. And it is possible to suppress the fluctuation of the optical output intensity and the reduction of the modulation efficiency.

When the input intensity of the light and/or the direct current voltage are reduced, the short breakage may be suppressed. In this case, however, an additional device such as an optical amplifier becomes necessary in order to achieve an output light having large intensity, resulting an enlarged size of a module package including the optical modulator 100 and the amplifier. Therefore, it is preferable that a light having large intensity is input to the optical modulator. When the direct current voltage on the modulation electrode 35 is too low, it is difficult to obtain preferable optical modulation characteristics. Therefore, a given voltage is applied for the purpose of achieving the modulation. In the first embodiment, as the width of the arm waveguide 34 becomes large in the region R2 before the edge of the modulation electrode 35, the short breakage is suppressed. Therefore, the optical intensity and the voltage may not be necessarily reduced. And it is possible to modulate a light having large intensity.

The width gradually increases in the region R2 between the region R1 and the region R3. The width gradually decreases in the region R4 between the region R3 and the region R5. Inclination angles of the region R2 and the region R4 are θ, with respect to the X-axis direction. For example, θ is 3 degrees or less. That is, tangent of the angle θ (tanθ) is 0.002 or more and 0.05 or less. When tanθ is 0.05 or less, the width does not rapidly change. The width continuously and slowly changes in the region R2 and the region R4. It is therefore possible to suppress excitation of unnecessary modes. When tanθ is 0.002 or more, the region R2 and the region R4 in which the width changes are short. The region having the width larger than W1 is short. The most part of the arm waveguide 34 (for example, 80% or more, or 90% or more) has the width W1. It is therefore possible to suppress reduction of the modulation efficiency.

It is preferable that the width W2 is twice or more than twice as large as the width W1. The width W2 may be 2.5 times as large as the width W1. The width W2 may be 3 times as large as the width W1. The larger the width W2 is, the lower the current density is. It is therefore possible to effectively suppress the short breakage. When the width W2 is large, unnecessary guided mode occurs. The width W2 is, for example, 2 μm or more and 5 μm or less, for the purpose of suppressing the short breakage and suppressing the unnecessary guided mode.

The region R1 and the region R5 have the common width W1. In other words, a part of the arm waveguide 34 other than the regions R2 to R4 has the width W1. The most part of the arm waveguide 34 is narrower than the region R3. Therefore, the unnecessary guided mode is suppressed. It is possible to propagate the light having a desirable mode such as a fundamental mode. The width of the region R1 and the width of the region R5 may be smaller than the width W2. Moreover, the width of the region R1 may be different from the width of the region R5.

The lower cladding layer 12, the lower cladding layer 13, the core layer 14, the upper cladding layer 16 and the contact layer 18 are provided on the substrate 10. The lower cladding layer 12 and the lower cladding layer 13 are n-type layers and are electrically connected with the ground electrode 36. The upper cladding layer 16 and the contact layer 18 are p-type layers and are electrically connected with the modulation electrode 35. Electrical field is applied to the core layer 14 in the Z-axis direction. Therefore, the current caused by the optical absorption flows in the Z-axis direction. When the width of the arm waveguide 34 in a direction (Y-axis direction) intersecting with the Z-axis direction is enlarged from W1 to W2, the current density is reduced. Therefore, the short breakage may be suppressed. In particular, it is preferable that the width in a direction vertical to the electrical field is changed. The ground electrode 36 contacts with the upper face of the lower cladding layer 12. However, the ground electrode 36 may be provided on another place such as the lower face of the substrate 10. The location of the ground electrode 36 is not limited when the electrical field along the Z-axis direction occurs in the arm waveguide 34.

As illustrated in FIG. 4A and FIG. 4B, the width of the arm waveguide 34 is constant in the Z-axis direction from the lower cladding layer 13 to the contact layer 18. Therefore, the electrical field is substantially constant in the width direction. In other words, the electrical field in the width direction is constant excepting a region near side surfaces of the arm waveguide 34 where the electrical field may slightly change due to surface states. When the width of the arm waveguide 34 is changed between W1 and W2, the current density can be reduced. The width of the modulation electrode 35 and the ground electrode 36 may not be necessarily changed.

The lower cladding layer 12 and the lower cladding layer 13 are made of n-type InP. The upper cladding layer 16 is made of p-type InP. The contact layer 18 is made of p-type InGaAs. The core layer is made of GaInAsP. When the current increases, melting of these layers may occur, resulting a short breakage. In particular, a melting point of a layer including P is lower than that of other layers not including P. The layer including P is broken more easily than the other layer not including P. In the first embodiment, it is possible to suppress the short breakage of the above-mentioned compound semiconductor layers. The layers of the arm waveguide 34 may be made of other compound semiconductor such as AlInAs or AlGaInAs.

In the first embodiment, as illustrated in FIG. 3, the arm waveguide 34 has a large width in a part thereof on the front side (−X side) in comparison to another part thereof overlapping with the modulation electrode 35. And the arm waveguide 34 has a small width under the modulation electrode 35. A direct current voltage is applied to the electrode 37 for phase adjustment illustrated in FIG. 2, as well as the modulation electrode 35. Therefore, the arm waveguide 34 under the electrode 37 absorbs a light and generates a current. In order to suppress the short breakage, the width of the arm waveguide 34 may be large before overlapping with the electrode 37 for phase adjustment and may be small under the electrode 37 for phase adjustment.

The closer to the input end (end of the input waveguide 31a) the position is, the larger the intensity of the light is. The intensity decreases from +X side to −X side. It is more effective that the first embodiment is applied to the vicinity of the modulation electrode 35 which has the large optical intensity. The optical intensity is improved, in a portion where the two arm waveguides 34 join with each other. Therefore, it is effective that the first embodiment is applied to a latter part of the arm waveguide 34 in comparison to the jointed position.

What is claimed is:

1. An optical modulator comprising:
a waveguide that is made of semiconductor and that includes an input waveguide, an optical coupler, a first arm waveguide, and a second arm waveguide, light input to the input waveguide being branched in the optical coupler into the first and the second arm waveguides; and
a first electrode that is provided on each of the first and the second arm waveguides and overlaps with the first and the second arm waveguides,
wherein each of the first and the second arm waveguides has a first region, a second region and a third region located along a propagation direction of the light in this order,
wherein, in the propagation direction, the second region of each of the first and the second arm waveguides has a part on a side of the first region and a part on a side of the third region,
wherein neither the first region nor the part of the second region on the side of the first region in the propagation direction overlaps with the first electrode,
wherein the third region and a part of the second region on the side of the third region in the propagation direction overlap with the first electrode,
wherein the first region has a first width,
wherein the second region has a second width,
wherein the third region has a third width, and
wherein the second width is larger than the first width and the third width.

2. The optical modulator as claimed in claim 1,
wherein the waveguide has a fourth region between the first region and the second region along the propagation direction,
wherein the waveguide has a fifth region between the second region and the third region along the propagation direction,
wherein a width of the fourth region increases from the side of the first region toward a side of the second region,
wherein a width of the fifth region decreases from the side of the second region toward the side of the third region, and
wherein a tangent of an inclination angle from the fourth region and the fifth region to the propagation direction is 0.002 or more and 0.05 or less.

3. The optical modulator as claimed in claim 1, wherein the second width is twice or more than twice as large as the first width.

4. The optical modulator as claimed in claim 1, wherein the second width is 2 μm or more and 5 μm or less.

5. The optical modulator as claimed in claim 1, wherein the third width is equal to the first width.

6. The optical modulator as claimed in claim 1, further comprising:
a substrate;
a first semiconductor layer that is provided on the substrate and has a first conductive type;
a core layer that is provided on the first semiconductor layer;
a second semiconductor layer that is provided on the core layer and has a second conductive type; and
a second electrode that is electrically connected with the first semiconductor layer,
wherein the first electrode is electrically connected with the second semiconductor layer, and
wherein the waveguide includes the first semiconductor layer, the core layer and the second semiconductor layer.

7. The optical modulator as claimed in claim 6,
wherein the first semiconductor layer and the second semiconductor layer include indium phosphorus and indium gallium arsenic, and
wherein the waveguide includes gallium indium arsenic phosphorus.

8. An optical modulator comprising:
a waveguide that is made of semiconductor and that has ends, light being input to one of the ends of the waveguide; and
an electrode that is provided on the waveguide and overlaps with the waveguide,
wherein the waveguide has a first region, a second region and a third region along a propagation direction of the light in this order from the one of the waveguide ends,
wherein, in the propagation direction, the second region of the waveguide has a part on a side of the first region, and a part on a side of the third region,
wherein the first region has a first width,
wherein the second region has a second width,
wherein the third region has a third width,
wherein the second width is larger than the first width and the third width,
wherein neither the first region nor a part of the second region on the side of the first region in the propagation direction overlaps with the electrode,
wherein the third region and a part of the second region on the side of the third region in the propagation direction overlap with the electrode, and
wherein the third region reaches an optical coupler with the third width.

* * * * *